United States Patent
Zhou et al.

(10) Patent No.: US 11,055,547 B2
(45) Date of Patent: Jul. 6, 2021

(54) UNLOCKING CONTROL METHOD AND RELATED PRODUCTS

(71) Applicant: GUANGDONG OPPO MOBILE TELECOMMUNICATIONS CORP., LTD., Guangdong (CN)

(72) Inventors: Yibao Zhou, Guangdong (CN); Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/624,229

(22) PCT Filed: Jul. 17, 2018

(86) PCT No.: PCT/CN2018/095942
§ 371 (c)(1),
(2) Date: Dec. 18, 2019

(87) PCT Pub. No.: WO2019/015575
PCT Pub. Date: Jan. 24, 2019

(65) Prior Publication Data
US 2020/0193199 A1    Jun. 18, 2020

(30) Foreign Application Priority Data
Jul. 18, 2017    (CN) .......................... 201710585207.3

(51) Int. Cl.
*G06K 9/00* (2006.01)
*G06F 21/32* (2013.01)
(Continued)

(52) U.S. Cl.
CPC ......... *G06K 9/00892* (2013.01); *G06F 21/32* (2013.01); *G06K 9/00087* (2013.01);
(Continued)

(58) Field of Classification Search
CPC .......... G06K 9/00892; G06K 9/00087; G06K 9/00919; G06K 9/6202; H04W 12/06; Y02D 30/70; H04L 2463/082
See application file for complete search history.

(56) References Cited

U.S. PATENT DOCUMENTS

2003/0165276 A1*  9/2003  Seeger ............... H04N 1/00241
                                                              382/278
2010/0245042 A1*  9/2010  Tsubaki .................. G06F 21/32
                                                              340/5.82
(Continued)

FOREIGN PATENT DOCUMENTS

CN    201638241 U    11/2010
CN    103618832       3/2014
(Continued)

OTHER PUBLICATIONS

WIPO, ISR for PCT/CN2018/095942, dated Oct. 24, 2018.
(Continued)

*Primary Examiner* — John B Strege
(74) *Attorney, Agent, or Firm* — Hodgson Russ LLP

(57) ABSTRACT

The embodiment of the disclosure provides an unlocking control method and related products. The method includes: detecting whether the electronic device is in a motion state; reducing a first recognition threshold to obtain a second recognition threshold when the electronic device is in a motion state; acquiring first biometric information when a matching value between first biometric information and first preset biometric template information is greater than the second recognition threshold; and acquiring second biometric information and performing an recognition operation on the second biometric information. The method can improve the efficiency of biometric recognition when the electronic device is in motion.

20 Claims, 5 Drawing Sheets

(51) Int. Cl.
*G06K 9/62* (2006.01)
*H04W 12/06* (2021.01)

(52) U.S. Cl.
CPC ....... *G06K 9/00919* (2013.01); *G06K 9/6202* (2013.01); *H04W 12/06* (2013.01)

(56) References Cited

U.S. PATENT DOCUMENTS

| | | | |
|---|---|---|---|
| 2013/0191908 | A1 | 7/2013 | Klein |
| 2015/0003693 | A1 | 1/2015 | Baca et al. |
| 2016/0063235 | A1 | 3/2016 | Tussy |
| 2018/0173863 | A1* | 6/2018 | Andersson ......... G06K 9/00892 |

FOREIGN PATENT DOCUMENTS

| | | |
|---|---|---|
| CN | 106156688 | 11/2016 |
| CN | 106250751 | 12/2016 |
| CN | 106250825 | 12/2016 |
| CN | 106407776 | 2/2017 |
| CN | 106599651 | 4/2017 |
| CN | 106599660 | 4/2017 |
| CN | 106599875 | 4/2017 |
| CN | 107451446 | 12/2017 |
| EP | 3188406 | 7/2017 |
| GB | 2517562 | 2/2015 |
| WO | 2017040867 | 3/2017 |

OTHER PUBLICATIONS

SIPO, First Office Action for CN Application No. 201710585207.3, dated Apr. 25, 2019.

SIPO, Second Office Action for CN Application No. 201710585207.3, dated Jul. 23, 2019.

EPO, Office Action for EP Application No. 18835435.1, dated Mar. 27, 2020.

SIPO, Notification to Grant Patent Right for Invention for CN Application No. 201710585207.3, dated Mar. 30, 2020.

EPO, Office Action issued for EP Application No. 188354351, dated Mar. 22, 2021.

IPIN, Office Action for IN Application No. 201917052970, dated Apr. 30, 2021.

* cited by examiner

UNLOCKING CONTROL METHOD AND RELATED PRODUCTS

CROSS-REFERENCE TO RELATED APPLICATIONS

This application is a U.S. national phase of International Application No. PCT/CN2018/095942, filed Jul. 17, 2018, which claims priority to Chinese Patent Application No. 201710585207.3, filed Jul. 18, 2017, the entire disclosures of which are incorporated herein by reference.

TECHNICAL FIELD

The present disclosure relates to the field of electronic device technologies, and more particular, to an unlocking control method and related products.

BACKGROUND

With the widespread use of electronic devices such as mobile phones, tablets, and the like, more and more applications can be supported by the electronic devices, and thereby their functions are becoming more and more powerful. Electronic devices are developing in a diversified and personalized way and becoming indispensable for users.

At present, multi-biometric authentication is increasingly favored by electronic equipment manufacturers. However, when the user is in motion, the electronic device is also in motion, so the captured biological information (for example, a fingerprint image) may be blurred, thereby reducing the efficiency of multi-biometric authentication.

SUMMARY

An embodiment of the disclosure provides an unlocking control method and related products, to solve the problem that a foldable and flexible display is inconvenient to be unlocked in a folded state.

In a first aspect, an embodiment of the disclosure provides an electronic device, which includes a motion sensor, an application processor, a memory, a first biometric recognition device and a second biometric recognition device, the motion sensor, the memory, the first biometric recognition device and the second biometric recognition device each are connected to the application processor, wherein the motion sensor is configured to detect whether the electronic device is in a motion state or not;
the first biometric recognition device is configured to acquire first biometric information;
the memory is configured to store first preset biometric template information;
the application processor is configured to reduce a first threshold to obtain a second recognition threshold, when the electronic device is in a motion state;
the second biometric recognition device is configured to acquire second biometric information when a matching value between the first biometric recognition information and the first preset biometric template information is greater than a second recognition threshold;
the application processor is further configured to perform a recognition operation on the second biometric information.

In a second aspect, an embodiment of the disclosure provides an unlocking control method, which comprises:
detecting whether the electronic device is in a motion state or not;
reducing a first recognition threshold to obtain a second recognition threshold, when the electronic device is in a motion state;
acquiring first biometric information; and
when a matching value between the first biometric recognition information and the first preset biometric template information is greater than a second recognition threshold, acquiring second biometric information, and performing a recognition operation on the second biometric information.

In a third aspect, an embodiment of the disclosure provides an unlocking control device, which includes:
a detecting unit, configured to detect whether the electronic device is in a motion state or not;
a reducing unit, configured to reduce a first recognition threshold to obtain a second recognition threshold, when the electronic device is in a motion state;
an acquiring unit, configured to acquire first biometric information; and
a processing unit, configured to acquire second biometric information and perform a recognition operation on the second biometric information, when a matching value between the first biometric recognition information and the first preset biometric template information is greater than a second recognition threshold.

In a fourth aspect, an embodiment of the disclosure provides an electronic device, which includes an application processor, a memory and one or more programs, the one or more programs are stored in the memory and is configured to be executed by the application processor, the one or more programs includes instructions configured to perform part of or all steps of the method of the second aspect.

In a fifth aspect, an embodiment of the disclosure provides a computer readable storage medium, which has a computer program stored therein. The computer program is configured to enable a computer to perform part of or all steps of the method of the second aspect.

In a sixth aspect, an embodiment of the disclosure provides a computer program product, which includes a non-transitory computer readable storage medium having a computer program stored therein, the computer program is executable to enable a computer to perform part of or all steps of the method of the second aspect. The computer program product can be a software installation package.

The embodiments of the disclosure has the following effects.

It can be seen that the embodiment of the disclosure includes the operations of: detecting whether the electronic device is in a motion state; reducing a first recognition threshold to obtain a second recognition threshold when the electronic device is in a motion state; acquiring first biometric information when a matching value between first biometric information and first preset biometric template information is greater than the second recognition threshold; and acquiring second biometric information and performing an recognition operation on the second biometric information. Thus, when the electronic device is in the motion state, the recognition threshold is reduced, thereby improving the efficiency of biometric recognition.

BRIEF DESCRIPTION OF THE DRAWINGS

In order to more clearly illustrate the embodiments of the disclosure or the technical solutions in the prior art, the drawings to be used in the embodiments or the prior art are briefly described below. Obviously, the following drawings are just for certain embodiments of the disclosure, and other drawings can be obtained according to these drawings without any creative effort for those skilled in the art.

DETAILED DESCRIPTION

Figure 1A:
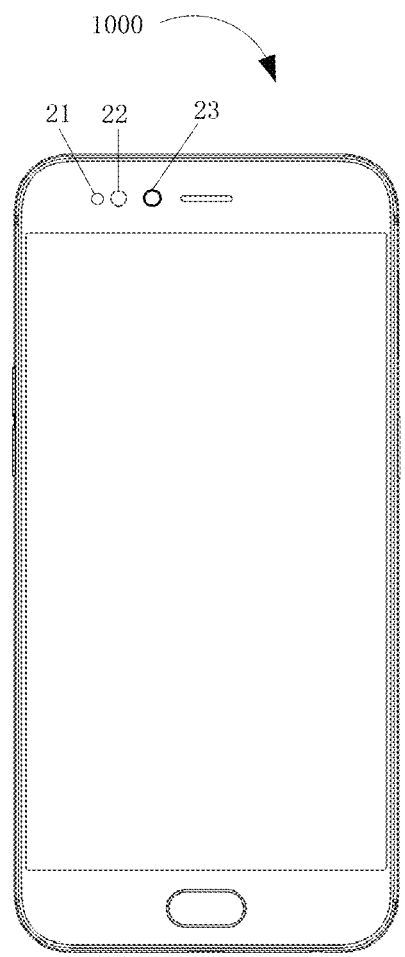
FIG. 1A is a schematic structural diagram of a smart phone according to an embodiment of the disclosure.

The technical solutions in the embodiments of the disclosure are clearly and completely described in the following with reference to the accompanying drawings of the embodiments, in order to enable those skilled in the art to better understand the disclosure. The embodiments described are just some of the disclosure but not all of the embodiments. All other embodiments obtained based on the embodiments of the disclosure without creative effort, by those skilled in the art, are within the scope of the disclosure.

The terms "first", "second" and the like in the specification and claims of the disclosure and the above drawings are used to distinguish different objects, and are not intended to describe a specific order thereof. The terms "comprising" and "having" and any variants thereof are intended to cover a non-exclusive inclusion. For example, a process, method, system, product, or device that comprises a series of steps or units is not limited to the listed steps or units, but optionally also includes not listed steps or units, or alternatively other steps or units inherent to the process, method, product, or device.

The "embodiment" mentioned in the disclosure means that, a particular feature, structure, or characteristic described in connection with the embodiment can be included in at least one embodiment of the disclosure. This term appeared in various positions of the specification is not necessarily referring to the same embodiment, and is not exclusive or alternative embodiment that is mutually exclusive with other embodiments. Those skilled in the art will understand obviously and implicitly that the embodiments described herein can be combined with other embodiments.

The electronic device referred to in the embodiments of the disclosure may include various handheld devices having wireless communication functions, in-vehicle devices, wearable devices, computing devices, or other processing devices connected to a wireless modem, and various forms of user equipment (UE), mobile station (MS), terminal device, etc. For convenience of description, the devices mentioned above are collectively referred to as electronic devices. Embodiments of the disclosure are described in detail below.

It should be noted that the electronic device in the embodiment of the disclosure may be installed with a multi-biometric device, and the multi-biometric device may be composed of a number of biometric devices. The biometric devices may include, but are not limited to, a fingerprint recognition device, an iris recognition device, a face recognition device, a vein recognition device, an electroencephalogram recognition device, an electrocardiogram recognition device, and the like, each of the biometric devices has a corresponding recognition algorithm and a recognition threshold, and each of the biometric devices has a corresponding template preset by a user. For example, the fingerprint recognition device has a preset fingerprint template corresponding thereto. Further, the fingerprint recognition device can collect a fingerprint image, and pass the recognition when a matching value between the fingerprint image and the preset fingerprint template is greater than a corresponding recognition threshold.

Further, a multi-biometric recognition mode in the embodiment of the disclosure may include two or more recognition operations, for example, a fingerprint recognition is performed at first, and then a face recognition can be performed after the passing of the fingerprint recognition, or, the fingerprint recognition and the face recognition can be performed synchronously. The multi-biometric recognition mode has better security than a single biometric recognition mode (for example, unlocking just by fingerprint recognition), and thus, the multi-biometric recognition mode is becoming more and more popular.

Further, in the embodiment of the disclosure, first biometric information may include, but is not limited to, fingerprint information, iris information, face information, vein information, brain wave information, electrocardiogram information, and the like. Second biometric information may include, but is not limited to, fingerprint information, iris information, face information, vein information, brain wave information, electrocardiogram information, and the like.

Optionally, a first biometric device is configured to acquire the first biometric information, and the first biometric device may be one of the follows: a fingerprint recognition device, an iris recognition device, a face recognition device, a vein recognition device, a brain wave recognition device, and an electroencephalogram recognition device, and the like.

Optionally, a second biometric device is configured to acquire the second biometric information, and the second biometric device may be one of the follows: a fingerprint recognition device, an iris recognition device, a face recognition device, a vein recognition device, a brain wave recognition device, and an electroencephalogram recognition device, and the like.

Optionally, the first biometric information may be different from the second biometric information. For example, the first biometric information is fingerprint information, the second biometric information is iris information. For another example, the first biometric information is iris information, and the second biometric information is face information. For still another example, the first biometric information is face information, and the second biometric information is iris information.

The embodiments of the disclosure are described in detail below. FIG. 1A illustrates an exemplary smart phone 1000, an iris recognition device of the smart phone 1000 may include an infrared fill light 21 and an infrared camera 22. During a working process of the iris recognition device, infrared lights emitted from the infrared fill light 21 reach the iris, and are reflected by the iris and then back to the infrared camera 22, so the iris recognition device can capture images of the iris. A front camera 23 can be used as a face recognition device.

Figure 1B:
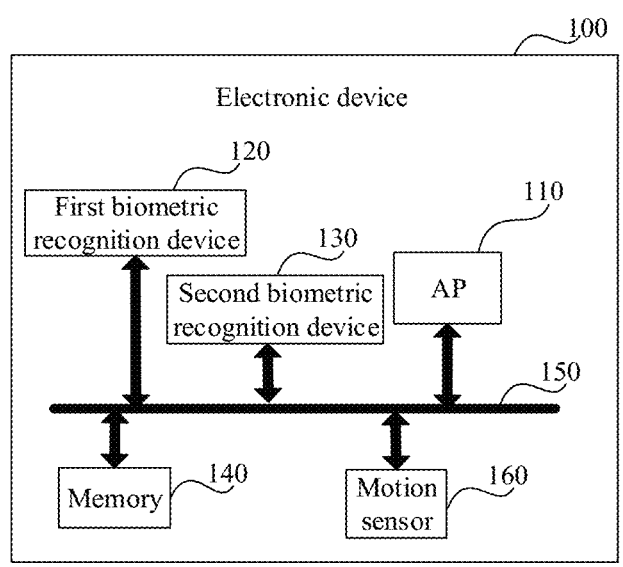
FIG. 1B is a schematic structural diagram of an electronic device according to an embodiment of the disclosure.

Referring to FIG. 1B, FIG. 1B is a schematic structural diagram of an electronic device 100. The electronic device 100 includes an application processor (AP) 110, a first biometric device 120, a second biometric device 130, a motion sensor 160 and a memory 140. The AP 110 is connected with the first biometric device 120, the second biometric device 130, the motion sensor 160, and the memory 140 via a bus 150.

In one possible embodiment, the motion sensor 160 is configured to detect whether the electronic device is in a motion state or not.

The first biometric device 120 is configured to acquire first biometric information.

The memory 140 is configured to store first preset biometric template information.

The AP 110 is configured to reduce a first recognition threshold and thereby to obtain a second recognition threshold, when the electronic device is in a motion state.

The second biometric device 130 is configured to acquire second biometric information when a matching value between the first biometric recognition information and the first preset biometric template information is greater than a second recognition threshold, thereby enabling the AP 110 to perform a recognition operation on the second biometric information.

In one possible embodiment, when detecting whether the electronic device is in a motion state or not, the motion sensor 160 is specifically configured to:
acquiring a motion curve using a gyroscope in a lens;
determining characteristic parameters of the motion curve; and
detecting whether the electronic device is in a motion state or not according to the characteristic parameters.

In one possible embodiment, when reducing a first recognition threshold and thereby to obtain a second recognition threshold, the AP 110 is specifically configured to:
acquiring an average acceleration of the electronic device;
determining, according to a correspondence between preset accelerations and proportional coefficients, a first proportional coefficient corresponding to the average acceleration; and
reducing the first recognition threshold according to the first proportional coefficient to obtain the second recognition threshold.

In one possible embodiment, when acquiring the first biometric information, the first biometric device 120 is specifically configured to:
acquiring a motion speed of the electronic device;
determining an anti-shake coefficient corresponding to the motion speed; and
acquiring the first biometric information according to the anti-shake coefficient.

In one possible embodiment, the AP 110 is also specifically configured to:
reducing a third recognition threshold thereby to obtain a fourth recognition threshold;

when performing a recognition operation on the second biometric information, the AP 110 is specifically configured to:
matching the second biometric information with a second preset biometric template information; and
performing an unlocking operation, when a matching value between the second biometric recognition information and the second preset biometric template information is greater than the fourth recognition threshold.

In one possible embodiment, the AP 110 is also specifically configured to: reminding the user to re-input first biometric information, when the matching value between the first biometric information and the first preset biometric template information is less than or equal to the second recognition threshold.

Figure 1C:
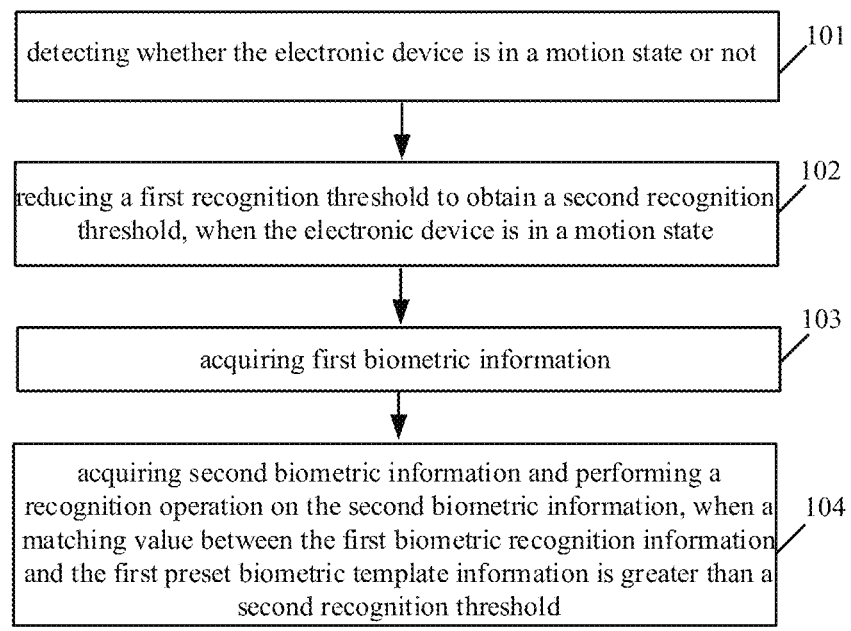
FIG. 1C is a flowchart of an unlocking control method according to an embodiment of the disclosure.

FIG. 1C is a schematic flowchart of an unlocking control method according to an embodiment of the disclosure. The unlocking control method is applied to an electronic device, wherein its physical map and structural diagram can be referred to FIG. 1A or FIG. 1B. The unlocking control method described in this embodiment includes the following steps.

101, the electronic device is detected whether it is in a motion state or not.

If the electronic device is in motion, captured images thereby are blurred, and thus, the efficiency of the biometric recognition may be affected. The electronic device can detect whether it is in motion by the following sensors, such as an acceleration sensor, a displacement sensor, a vibration sensor, a pedometer sensor, a gyroscope, and the like. The following step 102 can be performed when the electronic device is in motion.

Optionally, the foregoing step 101 of detecting whether the electronic device is in a motion state or not may include the following steps:
A1, acquiring a motion curve using a gyroscope in a lens;
A2, determining characteristic parameters of the motion curve; and
A3, detecting whether the electronic device is in a motion state or not according to the characteristic parameters.

During the movement of the electronic device, the gyroscope in the lens will also follow the movement. Thus, it is possible to record the motion states in a period of time, which form the motion curve. The motion curve has a horizontal axis of time and a vertical axis of displacement from the equilibrium position. Thus, the characteristic parameters can be derived from the motion curve, which can include, but are not limited to, speed, acceleration, amplitude, and the like. These characteristic parameters can be used to detect whether the electronic device is in motion.

For example, the above step A3 of detecting whether the electronic device is in a motion state according to the characteristic parameters may be implemented as follows: determining the electronic device is in a motion state when an acceleration is greater than a first threshold and an amplitude is greater than a second threshold. The first threshold and the second threshold may be set by the user or by the system.

Optionally, the foregoing step 101 of detecting whether the electronic device is in a motion state may include the following steps:
B1, capturing a number of images by using a camera of the electronic device; and
B2, determining, by the captured images, whether the electronic device is in a motion state or not.

When the electronic device is in motion, the captured images are likely to be blurred. Therefore, when more than one image is captured, it can be judged whether every image is blurred or not. If so, the electronic device is determined to be in motion. For example, when three images are captured and all three images are blurred, the electronic device is determined to be in motion. When judging whether every image is blurred, the following method may be adopted: determining a blurred region of any image, and determining the image is blurred when the area of the blurred region is larger than a preset blurred area.

102, reducing a first recognition threshold and thereby to obtain a second recognition threshold, when the electronic device is in a motion state.

When the electronic device is in a motion state, the image may be blurred. Therefore, the first recognition threshold may be appropriately reduced to obtain the second recognition threshold, thereby improving the recognition efficiency.

Optionally, the foregoing step 102 of reducing a first recognition threshold and thereby to obtain a second recognition threshold may include the following steps:

21, acquiring an average acceleration of the electronic device;

22, determining, according to a preset correspondence between accelerations and proportional coefficients, a first proportional coefficient corresponding to the average acceleration; and 23, reducing the first recognition threshold to obtain the second recognition threshold, according to the first proportional coefficient.

Accelerations during a specified time period can be determined by the gyroscope in the lens, and then the accelerations during the specified time period is averaged to obtain the instantaneous acceleration. The first proportional coefficient corresponding to the average acceleration may be determined according to the preset correspondence between the accelerations and the proportional coefficients, and further, the first recognition threshold is reduced to obtain the second recognition threshold, according to the first proportional coefficient. Wherein the proportional coefficient is in a range of 0~1. In this way, the recognition threshold can be reduced based on the acceleration. In the specific implementation, it maybe, the larger the acceleration, the smaller the proportional coefficient. For example, when the acceleration is 5 m/s, the first proportional coefficient is 0.8, and when the acceleration is 8 m/s, the first proportional coefficient is 0.6.

103, first biometric information is acquired.

The first biometric information maybe image information or characteristic texture information (i.e., information obtained after performing feature extraction on the image information).

Optionally, the foregoing step 103 of acquiring the first biometric information may include the following steps:

31, acquiring a motion speed of the electronic device;

32, determining an anti-shake coefficient corresponding to the motion speed; and 33, acquiring the first biometric information according to the anti-shake coefficient.

The motion speed of the electronic device can be detected, and the motion speed can be an average speed implemented by a step counter sensor. Generally, the more intense the motion, the more the camera shakes. Therefore, a correspondence between the motion speeds and the anti-shake coefficients can be preset, and the corresponding anti-shake coefficient corresponding to the acquired motion speed can be determined according to the correspondence, and further, the first biometric information can be acquired according to the corresponding anti-shake coefficient. The above anti-shake coefficient is an anti-shake coefficient for the camera, so that the camera can acquire the first biometric information more stably, thereby reducing a blurred region of the captured image.

Optionally, between the foregoing step 103 and a next step 104, the following step may be further included:
performing image enhancement processing on the first biometric information.

The first biometric information may be an image, for example, an iris image. Image enhancement processing may include, but is not limited to, image denoising (e.g., wavelet transform for image denoising), image restoration (e.g., Wiener filtering), dark visual enhancement algorithms (e.g., histogram equalization, grayscale stretching, etc.), and the like. Taking the iris image as an example, after the image enhancement processing, the quality of the iris image can be improved to some extent. Further, when performing the step 104, the first biometric information after the image enhancement processing may be matched with the first preset biometric template.

Optionally, between the foregoing step 103 and a next step 104, the following steps may be further included:

A31, performing image quality evaluation on the first biometric information, and obtaining an image quality evaluation value;

A32, performing image enhancement processing on the first biometric information when the image quality evaluation value is lower than a preset quality threshold.

The preset quality threshold may be set by the user or set by the system by default. The first biometric information may be processed by image quality evaluation to obtain the image quality evaluation value, and the quality of the iris image is determined by the image quality evaluation value. Taking the iris image as an example, when the image quality evaluation value is greater than or equal to the preset quality threshold, the iris image is considered to be qualified, and when the image quality evaluation value is less than the preset quality threshold, the iris image may be considered to be unqualified, thus image enhancement processing may be performed on the first biometric information.

In the above step A31, the first biometric information may be performed image quality evaluation with at least one image quality evaluation index, thereby obtaining the image quality evaluation value.

A number of image quality evaluation indexes may be included, and each image quality evaluation index corresponds to a weight. Thus, when performing image quality evaluation on the image with each of the image quality evaluation indexes, corresponding evaluation results can be obtained. Finally, the obtained evaluation results are weighted to obtain the image quality evaluation value. The image quality evaluation indexes may include, but are not limited to, average value, standard deviation, entropy, sharpness, signal to noise ratio, and the like.

It should be noted that when the image quality is evaluated by using a single evaluation index, there the evaluation result may be limited. Therefore, multiple image quality evaluation indexes can be used to evaluate the image quality. It is not the more evaluation indexes, the better the evaluation result, when evaluating image quality. Because the more evaluation indexes, the higher the computational complexity of the image quality evaluation process, and such may not result in a better effect to evaluate the image quality. Thus, 2-10 image quality evaluation indexes may be adopted to evaluate the image quality, in the case of high requirements for image quality evaluation. Specifically, the number of image quality evaluation indexes and which indexes are selected, are determined according to specific implementation situations. Of course, the image quality evaluation indexes should be selected in combination with specific scenes, and the image quality evaluation indexes selected in the dark environment and that selected in the bright environment are different.

Optionally, in the case that the image quality evaluation accuracy is not high, just one image quality evaluation index may be used for evaluation. For example, the image waited to be processed is evaluated using the entropy, it can be considered that the larger the entropy, the better the image quality, and conversely, the smaller the entropy, the worse the image quality.

Optionally, in the case that the image quality evaluation accuracy is relative high, the image may be evaluated by using a number of image quality evaluation indexes, the weight of each image quality evaluation index may be set, when obtaining a number of image quality evaluation values, a final image quality evaluation value may be obtained according to the image quality evaluation values and corresponding weights thereof. For example, three quality evaluation indexes are A index, B index and C index, the weight of A is a1, the weight of B is a2, and the weight of C is a3. When the indexes A, B and C are used to evaluate the image quality of one certain image, the image quality evaluation value corresponding to A is b1, the image quality evaluation value corresponding to B is b2, and the image quality evaluation value corresponding to C is b3, then the final image quality evaluation value=a1b1+a2b2+a3b3. In general, the larger the image quality evaluation value, the better the image quality.

104, when a matching value between the first biometric information and first preset biometric template information is greater than the second recognition threshold, second biometric information is acquired, and a recognition operation is performed on the second biometric information.

The first preset biometric template information may be pre-stored and implemented by a user registration before performing the step 101. The first preset biometric template information is collected by a first biometric recognition device. The first biometric information is matched with the first preset biometric template information, and thereby to obtain a matching value between the first biometric information and the first preset biometric template information. When the matching value is greater than the second recognition threshold, the second biometric information can be obtained, and the recognition operation is performed on the second biometric information.

Optionally, after the foregoing step 103, the following step may be further included: reminding the user to re-input the first biometric information, when the matching value between the first biometric information and the first preset biometric template information is less than or equal to the second recognition threshold.

If the matching value between the first biometric information and the first preset biometric template information is less than or equal to the second recognition threshold, the user is prompted to re-enter the first biometric information.

It can be seen that, the embodiment of the disclosure includes the operations of: detecting whether the electronic device is in a motion state; reducing a first recognition threshold to obtain a second recognition threshold when the electronic device is in a motion state; acquiring first biometric information when a matching value between first biometric information and first preset biometric template information is greater than the second recognition threshold; and acquiring second biometric information and performing an recognition operation on the second biometric information. Thus, when the electronic device is in the motion state, the recognition threshold is reduced, thereby improving the efficiency of biometric recognition.

Figure 2:
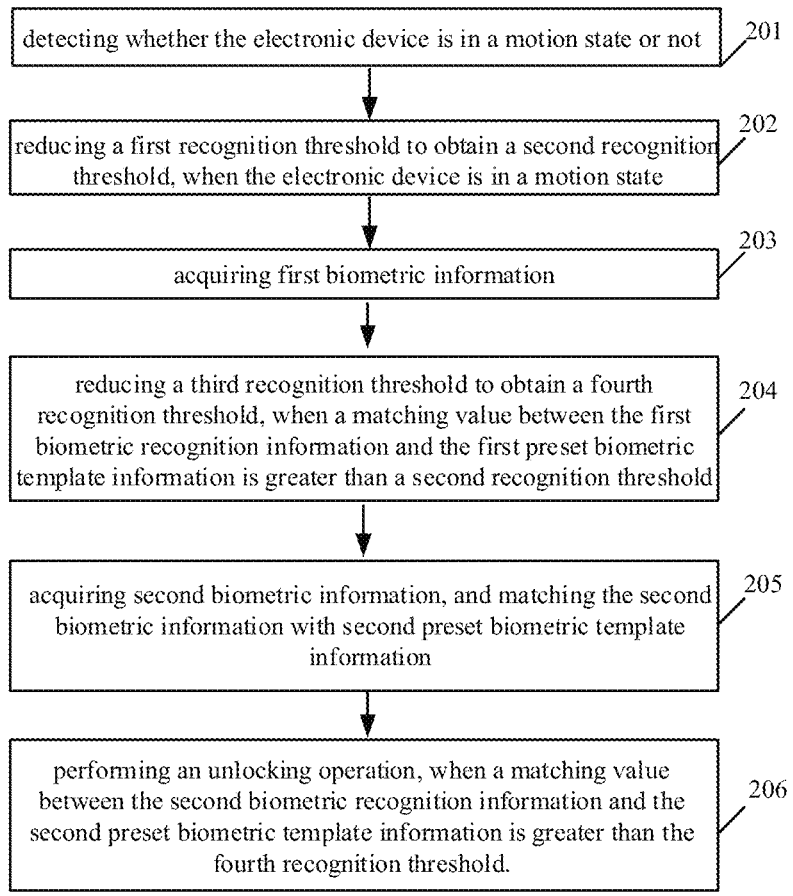
FIG. 2 is a flowchart of another unlocking control method according to an embodiment of the disclosure.

FIG. 2 is a schematic flowchart of an unlocking control method according to an embodiment of the disclosure. The unlocking control method is applied to an electronic device, wherein its physical map or structural diagram is illustrated in FIG. 1A or FIG. 1B. The unlocking control method described in this embodiment includes the following steps.

201, the electronic device is detected whether in motion state or not.

202, a first recognition threshold is reduced to obtain a second recognition threshold, when the electronic device is in motion state.

203, first biometric information is acquired.

Detailed description of the foregoing steps 201-203 can be referred to the corresponding steps of the unlocking control method described in FIG. 1C, and are not described herein again.

204, when a matching value between the first biometric information and first preset biometric template information is greater than the second recognition threshold, a third recognition threshold is reduced to obtain a fourth recognition threshold.

When the matching value between the first biometric information and the first preset biometric template information is less than or equal to the second recognition threshold, the user is prompted to re-enter the first biometric information.

Optionally, the foregoing step 204 of reducing the third recognition threshold to obtain the fourth recognition threshold may include the following steps:

21, acquiring an instantaneous acceleration of the electronic device.

22, determining, according to a preset correspondence between accelerations and proportional coefficients, a second proportional coefficient corresponding to the instantaneous acceleration; and

23, reducing the third recognition threshold to obtain the fourth recognition threshold, according to the second proportional coefficient.

The instantaneous accelerations can be obtained by the gyroscope in the lens, and the instantaneous acceleration can be understood as the acceleration acquired at the most recent moment. The second proportional coefficient corresponding to the average acceleration may be determined according to the preset correspondence between the accelerations and the proportional coefficients, and further, the third recognition threshold is reduced to obtain the fourth recognition threshold, according to the second proportional coefficient. Wherein the above-mentioned proportional coefficient is in a range of 0~1. In this way, the recognition threshold can be reduced based on the acceleration. In the specific implementation, it maybe, the larger the acceleration, the smaller the proportional coefficient. For example, when the acceleration is 5 m/s, the first proportional coefficient is 0.8, and when the acceleration is 8 m/s, the first proportional coefficient is 0.6.

205, second biometric information is acquired, and the second biometric information is matched with the second preset biometric template information.

The second preset biometric template information may be pre-stored and implemented by a user registration before performing the step 201. The second preset biometric template information is collected by a second biometric recognition device. The second biometric information is matched with the second preset biometric template information.

Optionally, the foregoing step 205 of acquiring the first biometric information may include the following steps:

51, acquiring a motion speed of the electronic device;

52, determining an anti-shake coefficient corresponding to the motion speed; and 53, acquiring the second biometric information according to the anti-shake coefficient.

The motion speed of the electronic device can be detected, and the motion speed can be an average speed obtained from a step counter sensor. Generally, the more intense the motion, the more the camera shakes. Therefore, a correspondence between the motion speeds and the anti-shake coefficients can be preset, and the corresponding anti-shake coefficient corresponding to the acquired motion speed can be determined according to the correspondence, and further, the second biometric information can be acquired according to the corresponding anti-shake coefficient. The above anti-shake coefficient is an anti-shake coefficient for the camera, so that the camera can acquire the second biometric information more stably, thereby reducing a blurred region of the captured image.

206, an unlocking operation is performed on the electronic device, when a matching value between the second biometric information and second preset biometric template information is greater than the fourth recognition threshold.

When the matching value between the second biometric information and the second preset biometric template information is greater than the fourth recognition threshold, the unlocking operation may be performed. The unlocking operation may be understood as: lighting the screen of the electronic device and entering the main page, or, entering the main page of the electronic device when it is in a bright screen state, or, entering a specified page of a certain application when the unlocking operation is for the application, wherein the specified page maybe set by the user or set by the system by default.

It can be seen that, the embodiment of the disclosure includes the operations of: detecting whether the electronic device is in a motion state; reducing a first recognition threshold to obtain a second recognition threshold when the electronic device is in a motion state; acquiring first biometric information when a matching value between first biometric information and first preset biometric template information is greater than the second recognition threshold; and acquiring second biometric information and performing an recognition operation on the second biometric information. Thus, when the electronic device is in the motion state, the recognition threshold is reduced, thereby improving the efficiency of biometric recognition.

Figure 3:
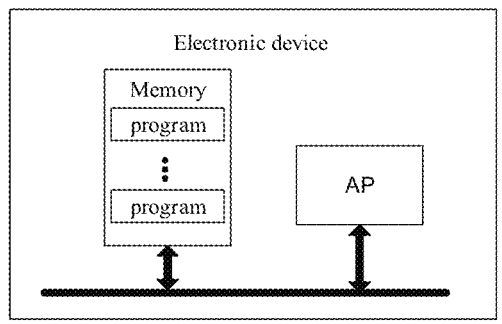
FIG. 3 is a schematic structural diagram of an electronic device according to an embodiment of the disclosure.

Referring to FIG. 3, FIG. 3 is an electronic device according to an embodiment of the disclosure. The electronic device includes an application processor AP, a memory; and one or more programs stored in the memory and executable by the AP. The one or more programs includes instructions for performing the following steps:

detecting whether the electronic device is in a motion state or not;

reducing a first recognition threshold to obtain a second recognition threshold, when the electronic device is in a motion state;

acquiring first biometric information; and when a matching value between the first biometric recognition information and the first preset biometric template information is greater than a second recognition threshold, acquiring second biometric information, and performing a recognition operation on the second biometric information.

In one possible embodiment, in the operation of detecting whether the electronic device is in a motion state or not, the program includes instructions configured to execute the following steps:

acquiring a motion curve using a gyroscope in a lens;

determining characteristic parameters of the motion curve; and detecting whether the electronic device is in a motion state or not according to the characteristic parameters.

In one possible embodiment, in the operation of reducing a first recognition threshold to obtain a second recognition threshold, the program includes instructions configured to execute the following steps:

acquiring an average acceleration of the electronic device;

determining, according to a preset correspondence between accelerations and proportional coefficients, a first proportional coefficient corresponding to the average acceleration; and reducing the first recognition threshold to obtain the second recognition threshold, according to the first proportional coefficient.

In one possible embodiment, in the operation of acquiring the first biometric information, the program includes instructions configured to execute the following steps:

acquiring a motion speed of the electronic device;

determining an anti-shake coefficient corresponding to the motion speed; and acquiring the first biometric information according to the anti-shake coefficient.

In one possible embodiment, the program includes instructions configured to execute the following step:

reducing a third recognition threshold thereby to obtain a fourth recognition threshold; in the operation of performing a recognition operation on the second biometric information, the program includes instructions configured to execute the following steps:

matching the second biometric information with a second preset biometric template information; and performing an unlocking operation, when a matching value between the second biometric recognition information and the second preset biometric template information is greater than the fourth recognition threshold.

In one possible embodiment, the program includes instructions configured to execute the following step:

reminding the user to re-input first biometric information, when the matching value between the first biometric information and the first preset biometric template information is less than or equal to the second recognition threshold.

Figure 4A:
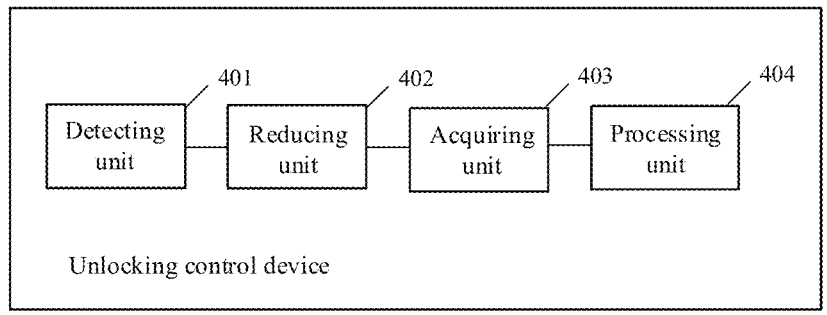
FIG. 4A is a schematic structural diagram of an unlocking control device according to an embodiment of the disclosure.

Referring to FIG. 4A, FIG. 4A is a schematic structural diagram of an unlocking control device according to one embodiment of the disclosure. The unlocking control device is applied in an electronic device, and includes a detecting unit 401, a reducing unit 402, an acquiring unit 403 and a processing unit 404.

The detecting unit 401 is configured to detect whether the electronic device is in a motion state or not.

The reducing unit 402 is configured to reduce a first recognition threshold to obtain a second recognition threshold, when the electronic device is in a motion state.

The acquiring unit 403 is configured to acquire first biometric information.

The processing unit 404 is configured to acquiring second biometric information and performing a recognition operation on the second biometric information, when a matching value between the first biometric recognition information and the first preset biometric template information is greater than a second recognition threshold.

Figure 4B:
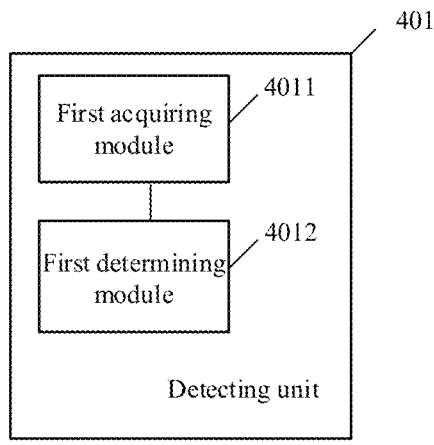
FIG. 4B is a schematic structural diagram of a detecting unit of the unlocking control device illustrated in FIG. 4A, according to an embodiment of the disclosure.

Optionally, as illustrated in FIG. 4B, FIG. 4B is a specific detailed structure of the detecting unit 401 of the unlocking control device of FIG. 4A. The detecting unit 401 may include a first acquiring module 4011 and a first determining module 4012, details are as follows.

The first acquiring module 4011 is configured to acquire a motion curve using a gyroscope in a lens.

The first determining module 4012 is configured to determine characteristic parameters of the motion curve.

The first determining module 4012 is further configured to detect whether the electronic device is in a motion state or not according to the characteristic parameters.

Figure 4C:
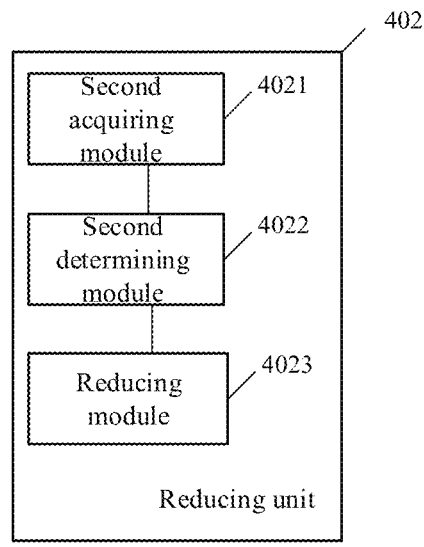
FIG. 4C is a schematic structural diagram of a reducing unit of the unlocking control device illustrated in FIG. 4A, according to an embodiment of the disclosure.

Optionally, as illustrated in FIG. 4C, FIG. 4C is a specific detailed structure of the reducing unit 402 of the unlocking control device of FIG. 4A. The reducing unit 402 may include a second acquiring module 4021, a second determining module 4022 and a reducing module 4023, and details are as follows.

The second acquiring module 4021 is configured to acquire an average acceleration of the electronic device.

The second determining module 4022 is configured to determine, according to a preset correspondence between accelerations and proportional coefficients, a first proportional coefficient corresponding to the average acceleration.

The reducing module 4023 is configured to reduce the first recognition threshold to obtain the second recognition threshold, according to the first proportional coefficient.

Figure 4D:
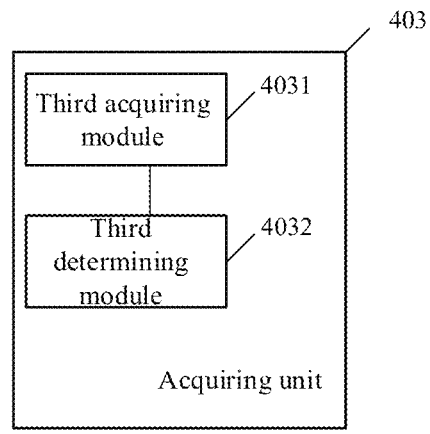
FIG. 4D is a schematic structural diagram of an acquiring unit of the unlocking control device illustrated in FIG. 4A, according to an embodiment of the disclosure.

Optionally, as illustrated in FIG. 4D, FIG. 4D is a specific detailed structure of the acquiring unit 403 of the unlocking control device of FIG. 4A. The acquiring unit 403 may include a third acquiring module 4031 and a third determining module 4032, and details are as follows.

The third acquiring module 4031 is configured to acquire a motion speed of the electronic device.

The third determining module 4032 is configured to determine an anti-shake coefficient corresponding to the motion speed.

The third acquiring module 4031 is further configured to acquire the first biometric information according to the anti-shake coefficient.

Optionally, the reducing unit 402 is specifically configured to reduce a third recognition threshold to obtain a fourth recognition threshold. The specific implementation manner in which the processing unit 404 performs the recognition operation on the second biometric information is:
matching the second biometric information with a second preset biometric template information; and performing an unlocking operation, when a matching value between the second biometric recognition information and the second preset biometric template information is greater than the fourth recognition threshold.

Figure 4E:
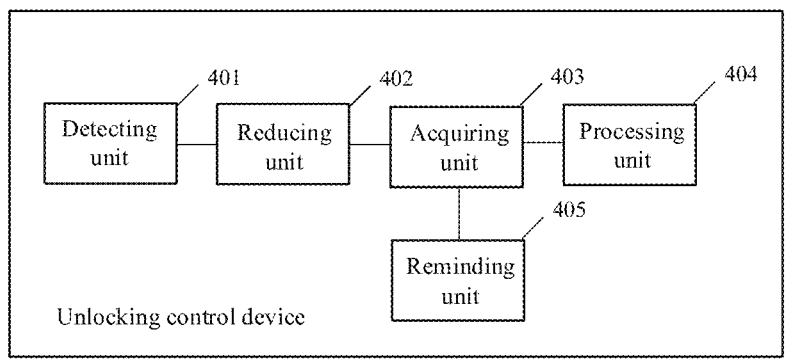
FIG. 4E is a schematic structural diagram of another unlocking control device according to an embodiment of the disclosure.

Optionally, as illustrated in FIG. 4E, FIG. 4E is a modified structure of the unlocking control device shown in FIG. 4A. Compared with FIG. 4A, the unlocking control device of FIG. 4E further includes a reminding unit 405 as follows.

The reminding unit 405 is configured to remind the user to re-input first biometric information, when the matching value between the first biometric information and the first preset biometric template information is less than or equal to the second recognition threshold.

It can be seen that, the embodiment of the disclosure includes the operations of: detecting whether the electronic device is in a motion state; reducing a first recognition threshold to obtain a second recognition threshold when the electronic device is in a motion state; acquiring first biometric information when a matching value between first biometric information and first preset biometric template information is greater than the second recognition threshold; and acquiring second biometric information and performing an recognition operation on the second biometric information. Thus, when the electronic device is in the motion state, the recognition threshold is reduced, thereby improving the efficiency of biometric recognition.

It can be understood that, the functions of the program modules in the unlocking control device may be specifically implemented according to the method in the foregoing method embodiments. Specific implementation processes may be referred to the descriptions of the foregoing method embodiments, and details are not described herein again.

Figure 5:
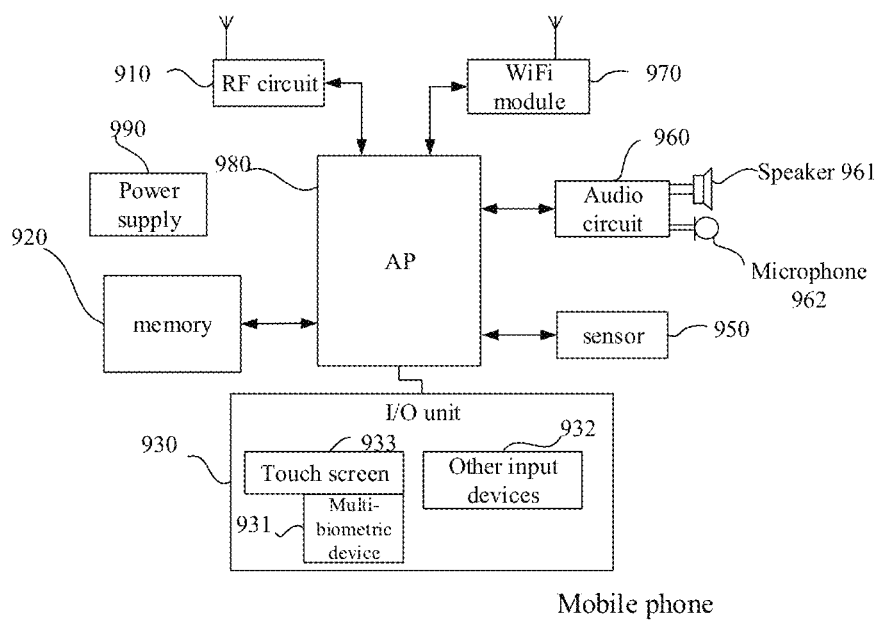
FIG. 5 is a schematic structural diagram of still another electronic device according to an embodiment of the disclosure.

FIG. 5 illustrates another electronic device, according to an embodiment of the disclosure. For the convenience of description, just portions related to the embodiments of the disclosure are illustrated. The specific technical details not disclosed can be referred to the method embodiments of the disclosure. The electronic device may be any terminal device selected form a mobile phone, a tablet computer, a personal digital assistant (PDA), a point of sales (POS), an in-vehicle computer, and the like. The mobile phone is taken as an example.

FIG. 5 is a block diagram showing a part of structures of a mobile phone related to an electronic device provided by an embodiment of the disclosure. Referring to FIG. 5, the mobile phone includes a radio frequency (RF) circuit 910, a memory 920, an input unit 930, a sensor 950, an audio circuit 960, a wireless fidelity (WiFi) module 970, an application processor (AP) 980, a power supply 990 and the like. It will be understood by those skilled in the art that the structures of the mobile phone as shown in FIG. 5 does not constitute a limitation to the mobile phone, and the mobile phone may include more or less components than those illustrated, or a combination of some components, or different arrangements of the components.

The following describes the components of the mobile phone in detail with reference to FIG. 5.

The input unit 930 can be used to receive input numeric or character information, as well as to generate signal inputs related to user settings and function controls. Specifically, the input unit 930 can include a touch display 933, a multi-biometric recognition device 931 and other input devices 932. The multi-biometric recognition device 931 at least includes two biometric recognition devices (e.g., face recognition device and iris recognition device). The input unit 930 also includes other input devices 932. Specifically, other input devices 932 may include, but are not limited to, one or more of a physical keyboard, function keys (such as volume control buttons, switch buttons, etc.), a trackball, a mouse, a joystick, and the like.

The AP 980 is configured to execute the operations of:
detecting whether the electronic device is in a motion state or not;
reducing a first recognition threshold to obtain a second recognition threshold, when the electronic device is in a motion state;
acquiring first biometric information; and
when a matching value between the first biometric recognition information and the first preset biometric template information is greater than a second recognition threshold, acquiring second biometric information, and performing a recognition operation on the second biometric information.

The AP 980 is the control center of the mobile phone, which connects various portions of the entire phone using various interfaces and lines, by performing or executing software programs and/or modules stored in the memory 920, and by invoking data stored in the memory 920, thereby implementing the various functions of the mobile phone and processing data to monitor the mobile phone. Optionally, the AP 980 may include one or more processing cores. Optionally, the AP 980 may integrate an application processor and a modem processor, where the application processor mainly processes the operating system, the user interfaces, the applications, and the like, and the modem processor primarily handles wireless communications. It will be understood that the above described modem processor may also not be integrated into the AP 980.

Moreover, the memory 920 can include a high speed random access memory, and can also include a non-volatile memory, such as at least one magnetic disk storage device, a flash memory device, or other volatile solid state storage device.

The RF circuit 910 can be used for transmitting and receiving messages. Generally, the RF circuit 910 includes, but is not limited to, an antenna, at least one amplifier, a tuner, one or more oscillators, a Subscriber Identity Module (SIM) card, a transceiver, a coupler, a low noise amplifier (LNA), and a duplexer, etc. In addition, the RF circuit 910 can also communicate with the network and other devices through wireless communication. The wireless communication may use any communication standard or protocol, including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The mobile phone also can include at least one type of the sensor 950, such as a light sensor, a motion sensor, and other sensors. Specifically, the light sensor may include an ambient light sensor and a proximity sensor, wherein the ambient light sensor may adjust the brightness of the touch display according to the brightness of the ambient light, and the proximity sensor may close the touch display and/or the backlight when the mobile phone moves to the ear of the user. As a kind of motion sensor, a gravity acceleration sensor can detect the magnitude of acceleration in all directions (usually three axes). When it is stationary, it can detect the magnitude and direction of gravity. It can be used to identify the gesture of the mobile phone (such as horizontal and vertical screen switching, related games, magnetometer attitude calibrations), vibration recognition related functions (such as a pedometer, the tapping), etc. Other sensors such as gyroscopes, barometers, hygrometers, thermometers, infrared sensors, etc., also can be disposed in the mobile phone and are not detailed here.

The audio circuit 960, a speaker 961, and a microphone 962 can provide an audio interface between the user and the terminal 900. The audio circuit 960 can convert the received audio data into electrical signals and transmit the electrical signals to the speaker 961, the speaker 961 converts the electrical signals into sound signals and output the sound signals. On the other hand, the microphone 962 converts the collected sound signals into electrical signals, the electrical signals are received by the audio circuit 960 and then converted into audio data, the audio data is then processed by the AP 980, and then is sent to another terminal via the RF circuitry 910, or the audio data is output to the memory 920 for further processing.

WiFi is a short-range wireless transmission technology, and the mobile phone can help users to send and receive emails, browse web pages, and access streaming media through the WiFi module 970, which provides wireless broadband internet access for users. Although FIG. 5 shows the WiFi module 970, it can be understood that it is not the necessary configuration of the terminal, and may be omitted as needed within the scope of not changing the essence of the disclosure.

The mobile phone also includes the power supply 990 (such as a battery) that supplies power to the various components. Optionally, the power supply 990 can be logically coupled to the AP 980 through a power management system to manage functions such as charging, discharging, and power management.

Although not shown, the mobile phone may further include a camera, a Bluetooth module, and the like, and details are not described herein again.

In the foregoing embodiments shown in FIG. 1C and FIG. 2, each step, method, or operation can be implemented based on the structure of the mobile phone.

In the foregoing embodiments shown in FIG. 3 and FIG. 4A to FIG. 4E, the function of each unit can be implemented based on the structure of the mobile phone.

The embodiment of the disclosure further provides a computer storage medium, wherein the computer storage medium stores a computer program, which enables the computer to execute a part of steps or all steps of any of the unlocking control method as described in the foregoing method embodiments.

The embodiment of the disclosure further provides a computer program product, which includes a non-transitory computer readable storage medium storing a computer program, the computer program being executable to enable a computer to perform a part of steps or all steps of the unlocking control method recited in the foregoing method embodiments.

It should be noted that, for simple description, the foregoing method embodiments are all described as a series of operation combinations, but those skilled in the art should understand that the disclosure is not limited by the described action sequence. Because certain steps may be performed in other sequences or concurrently, according to the embodiments of the disclosure. Those skilled in the art should also understand that the embodiments described in the specification are all preferred embodiments, and the operations and modules involved are not necessarily by the disclosure.

In the above embodiments, the description of every embodiment is different, and the details that are not described in a certain embodiment can be referred to the related descriptions of other embodiments.

In several embodiments of the disclosure, it should be understood that the disclosed device may be implemented in other manners. The device embodiments described above are merely illustrative. For example, the division of the unit is only a logical function division. In actual implementation, there may be another division manner, such as multiple units or components may be combined or may be integrated into another system, or some features can be omitted or not executed. In addition, the mutual coupling or direct coupling or communication connection shown or discussed may be an indirect coupling or communicating connection through some interfaces, devices or units, and may be electrical or other ways.

The units described as separate components maybe or maybe not physically separated, and the components shown as units maybe or maybe not physical units, that is, the component may be located in one place, or may be distributed to several network units. Some or all of the units may be selected according to actual needs to achieve the purpose of the solution of the embodiment.

Each functional unit in the embodiment of the disclosure may be integrated into one processing module, or each unit may exist physically separately, or two or more units may be integrated into one module. The above integrated modules can be implemented in the form of hardware or in the form of software functional modules.

The integrated modules, if implemented in the form of software functional modules and sold or used as stand-alone products, may also be stored in a computer readable storage medium. Based on such understanding, the technical solution of the disclosure, in essence or the contribution to the prior art, or all or part of the technical solution may be embodied in the form of a software product. The software product is stored in a memory, and includes a number of instructions configured to enable a computer device (may be a personal computer, a server or a network device, etc.) to perform all or part of the steps of the methods described in the embodiments of the disclosure. The foregoing memory includes a U disk, a read-only memory (ROM), a random access memory (RAM), a mobile hard disk, a magnetic disk, or an optical disk, and the like, that can store program codes.

A person skilled in the art can understand that all or part of the steps of the foregoing embodiments can be performed by a program to instruct related hardware, and the program can be stored in a computer readable memory, and the memory can include a flash drive, a ROM, a RAM, a disk or a CD.

The embodiments of the disclosure have been described in detail above. The principle and implementation of the disclosure are described in the specific examples. The description of the above embodiments is only used to help to understand the method and the spirit of the disclosure. Those skilled in the art may modify the specific embodiments and the scope of the application according to the spirit of the disclosure. In summary, the content of the specification should not be construed as limitations of the disclosure.

What is claimed is:

1. An electronic device, comprising a motion sensor, an application processor, a memory, a first biometric recognition device and a second biometric recognition device, the motion sensor, the memory, the first biometric recognition device and the second biometric recognition device each being connected to the application processor, wherein
the motion sensor is configured to detect whether the electronic device is in a motion state or not;
the first biometric recognition device is configured to acquire a motion speed of the electronic device, determine an anti-shake coefficient corresponding to the motion speed, and acquire first biometric information according to the anti-shake coefficient;
the memory is configured to store first preset biometric template information;
the application processor is configured to reduce a first threshold to obtain a second recognition threshold, when the electronic device is in a motion state;
the second biometric recognition device is configured to acquire second biometric information when a matching value between the first biometric recognition information and the first preset biometric template information is greater than a second recognition threshold; and
the application processor is further configured to perform a recognition operation on the second biometric information.

2. The electronic device according to claim 1, wherein the motion sensor is configured to:

acquire a motion curve using a gyroscope in a lens;
determine characteristic parameters of the motion curve; and
detect whether the electronic device is in a motion state or not according to the characteristic parameters.

3. The electronic device according to claim 1, wherein the application processor is configured to:
acquire an average acceleration of the electronic device;
determine, according to a preset correspondence between accelerations and proportional coefficients, a first proportional coefficient corresponding to the average acceleration; and
reduce, according to the first proportional coefficient, the first recognition threshold to obtain the second recognition threshold.

4. The electronic device according to claim 1, wherein the application processor is further configured to:
reduce a third recognition threshold to obtain a fourth recognition threshold;
when performing a recognition operation on the second biometric information, the application processor is specifically configured to: match the second biometric information with second preset biometric template information; and perform an unlocking operation, when a matching value between the second biometric recognition information and the second preset biometric template information is greater than the fourth recognition threshold.

5. The electronic device according to claim 1, wherein the application processor is further configured to:
remind a user to re-input the first biometric information, when the matching value between the first biometric information and the first preset biometric template information is less than or equal to the second recognition threshold.

6. An unlocking control method, comprising:
acquiring a motion curve using a gyroscope in a lens of an electronic device;
determining characteristic parameters of the motion curve;
detecting, according to the characteristic parameters, motion of the electronic device;
reducing a first recognition threshold to obtain a second recognition threshold;
acquiring first biometric information; and
upon determining a matching value between the first biometric recognition information and first preset biometric template information is greater than the second recognition threshold, acquiring second biometric information, and performing a recognition operation on the second biometric information.

7. The method according to claim 6, wherein the first biometric information is an image, after acquiring the first biometric information, the method further comprises:
performing image quality evaluation on the first biometric information, and obtaining an image quality evaluation value; and
performing image enhancement processing on the first biometric information upon determining the image quality evaluation value is lower than a preset quality threshold.

8. The method according to claim 7, wherein the first biometric information is evaluated by more than one image quality evaluation indexes, and the more than one image quality evaluation indexes each correspond to a weight.

9. The method according to claim 8, wherein the image quality evaluation indexes are selected from a group consisting of average value, standard deviation, entropy, sharpness, and signal to noise ratio.

10. The method according to claim 6, wherein the first biometric information is an image, after acquiring the first biometric information, the method further comprises:
performing an image enhancement processing on the first biometric information.

11. The method according to claim 6, wherein the operation of reducing a first recognition threshold to obtain a second recognition threshold comprises:
acquiring an average acceleration of the electronic device;
determining, according to a preset correspondence between accelerations and proportional coefficients, a first proportional coefficient corresponding to the average acceleration; and
reducing, according to the first proportional coefficient, the first recognition threshold to obtain the second recognition threshold.

12. The method according to claim 6, wherein the operation of acquiring first biometric information comprises:
acquiring a motion speed of the electronic device;
determining an anti-shake coefficient corresponding to the motion speed; and
acquiring the first biometric information according to the anti-shake coefficient.

13. The method according to claim 6, wherein the method further comprises:
reducing a third recognition threshold to obtain a fourth recognition threshold;
the operation of performing a recognition operation on the second biometric information comprises:
matching the second biometric information with second preset biometric template information; and performing an unlocking operation, upon determining a matching value between the second biometric recognition information and the second preset biometric template information is greater than the fourth recognition threshold.

14. The method according to claim 6, wherein the method further comprises:
reminding a user to re-input the first biometric information, upon determining the matching value between the first biometric information and the first preset biometric template information is less than or equal to the second recognition threshold.

15. The method according to claim 6, wherein the first preset biometric template information is pre-stored prior to the detecting, according to the characteristic parameters, motion of the electronic device.

16. The method according to claim 6, wherein the operation of detecting, according to the characteristic parameters, motion of the electronic device comprises:
capturing a plurality of images through a camera of the electronic device; and
determining, by the captured images, the motion of the electronic device.

17. The method according to claim 16, wherein determining, by the captured images, the motion of the electronic device comprises:
determining, by determining that each of the plurality of images are blurred, the motion of the electronic device.

18. An electronic device, comprising an application processor, a memory and one or more programs, wherein the one or more programs are stored in the memory and is configured to be executed by the application processor, the application processor performs an unlocking control method when executing the one or more programs, the method comprises:
detecting motion of the electronic device;
acquiring an average acceleration of the electronic device;
determining, according to a preset correspondence between accelerations and proportional coefficients, a first proportional coefficient corresponding to the average acceleration;
reducing, according to the first proportional coefficient, a first recognition threshold to obtain a second recognition threshold;
acquiring first biometric information; and
upon determining a matching value between the first biometric recognition information and first preset biometric template information is greater than the second recognition threshold, acquiring second biometric information, and performing a recognition operation on the second biometric information.

19. The electronic device according to claim 18, wherein the operation of acquiring first biometric information comprises:
acquiring a motion speed of the electronic device;
determining an anti-shake coefficient corresponding to the motion speed; and
acquiring the first biometric information according to the anti-shake coefficient.

20. The electronic device according to claim 18, wherein the method further comprises:
reducing a third recognition threshold to obtain a fourth recognition threshold; and
the operation of performing a recognition operation on the second biometric information comprises:
matching the second biometric information with second preset biometric template information; and performing an unlocking operation, upon determining a matching value between the second biometric recognition information and the second preset biometric template information is greater than the fourth recognition threshold.

* * * * *